A. B. LOW.
PRESSURE GAGE.
APPLICATION FILED JUNE 19, 1920.

1,392,587. Patented Oct. 4, 1921.

Witnesses
John B. Oade.

Inventor
Arthur B. Low.
by Wilkinson & Ginsta
his Attorneys

UNITED STATES PATENT OFFICE.

ARTHUR B. LOW, OF DENVER, COLORADO.

PRESSURE-GAGE.

1,392,587. Specification of Letters Patent. Patented Oct. 4, 1921.

Application filed June 19, 1920. Serial No. 390,109.

*To all whom it may concern:*

Be it known that I, ARTHUR B. LOW, a citizen of the United States, residing at the city and county of Denver and State of Colorado, have invented certain new and useful Improvements in Pressure-Gages; and I do hereby declare the following to be a full, clear, and exact description of the invention, such as will enable others skilled in the art to which it appertains to make and use the same.

This invention relates to pressure gages, and embodies certain novel improvements which are more particularly combined to provide a very handy article of manufacture for indicating the pressure within an inflated pneumatic tire for automobiles or analogous vehicles, although it will be understood that the improved article may likewise be efficiently employed, should occasions arise, in other relations where a pressure chamber provides a suitable nipple and stem controlled valve therefor.

The primary aim of the invention has been to devise a very small portable pressure gage, of the type set forth, that will not only satisfactorily fulfil all of the requirements for which they are employed, but which also provides such a device that is of minimum dimensions especially as to length, having a minimum number of coöperating parts little liable to get out of order or otherwise improperly function, which is self-contained and of smoothly finished and ornate exterior, and which as a whole is so compact as to occupy inconsequential space when stored in a pocket or otherwise.

Figure 1:
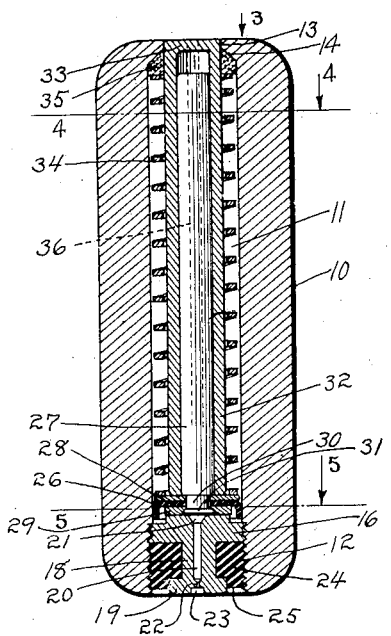
Figure 2:
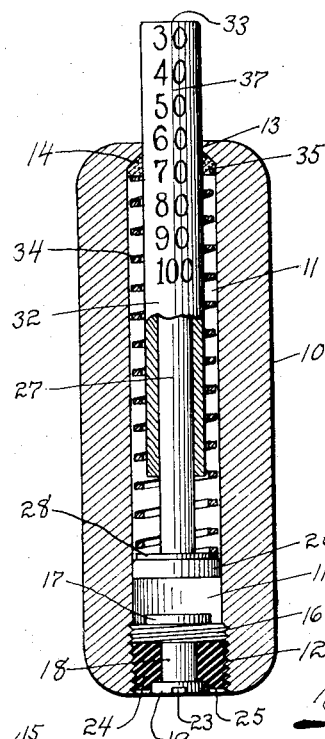
Figure 3:
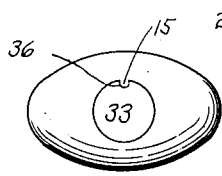
Figure 4:
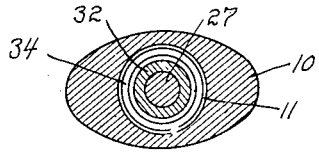
Figure 5:
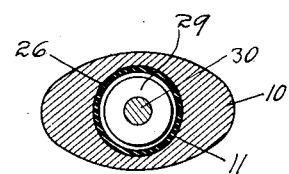
Figure 6:
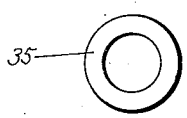
Figure 8:
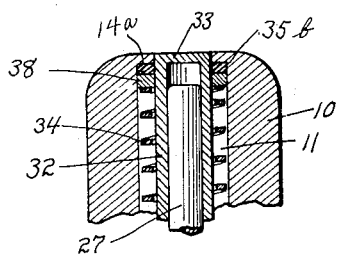

In addition to the compactness of the device, its simplicity in assembling and operation, and the comparatively small cost of manufacturing and marketing the same, other objects and advantages of the invention will be so clearly apparent, as incidental to the following disclosure, that it would only be surplusage to further enlarge upon the same initially, and with these prefacing remarks, as well as for a clearer conception of the novel features more particularly set forth in the appended claims, reference will immediately be had to the accompanying drawings, illustrating a practical and preferred embodiment of the improvements, in which drawings Figure 1 is a longitudinal sectional view through the preferred form of the device as it appears when not in use, the section being taken along the plane of its major axis, and the device being shown on a greatly exaggerated scale for the purpose of clearer illustration; Fig. 2 is a substantially analogous view, with some of the interior parts shown in elevation, but with the piston shown as being retracted, while the indicator element is maintained elevated in set position, after the device has been applied in use and detached; Fig. 3 is a top plan view; Figs. 4 and 5 are transverse sectional views, taken respectively along the planes of the lines 4—4 and 5—5 of Fig. 1; Fig. 6 is a plan view of one form of retaining means yieldingly associated with the indicator element, which may be in the nature of a closed washer of cork or other suitable material, encompassing the indicator element in yielding frictional engagement; Fig. 7 is a plan view of an analogous yielding washer of split formation; and Fig. 8 is a fragmentary sectional view analogous to Fig. 1, but illustrating a modification of the retaining washer and the manner of its seating.

10 designates the casing, providing an open-ended longitudinal chamber 11 therethrough which is internally threaded at one end, as at 12, while its other end is smooth and slightly restricted, as at 13, to provide an internal shoulder which is preferably in the nature of a beveled or conical seat 14, for a purpose hereinafter appearing.

As would be indicated by the drawings, the casing is preferably shaped as an oval, or perhaps more correctly stated as elliptical, in cross-section and is rounded off to form exterior top and bottom faces of substantially convex formation, the whole providing an extremely short lengthed casing that is not only of very conveniently shaped design but which is also attractively smooth finished. In conjunction with some features of the improvements at least, doubtless the chamber 11 might be provided for by an ordinary short tube section, properly capped at the top and plugged at the bottom, but from other more desirable aspects it is preferably formed as a longitudinal bore through an otherwise solid metallic blank, of the elongated elliptical design as illustrated, and providing the conical seat 14 with the restricted aperture 13. Also, while the open end 13 is preferably cylindrical to receive a cylindrical indicator barrel or sleeve, both the indicator element and the opening 13 could be of other shapes in cross section without necessarily avoiding the spirit of the invention.

In employing a longitudinally bored solid blank, of substantially the elongated elliptical design illustrated, instead of a cylindrical tube as the casing, and outside of its most convenient shape for handling and storing in the pocket and its rounded off or finished appearance, the feature also has the additional important function of insuring substantial solidity and protection against abusive use, as distinguished for instance from a mere casing tube, liable to become bent or dented and thus materially interfering with the requisite freedom of movement of the piston, if not indeed wholly impairing its operation.

The reduced opening 13 may have an internal tongue 15, see Fig. 3, and at the threaded end of the casing there is provided a plug closure.

This plug closure embodies an externally threaded base disk 16 having an annular flat surfaced shoulder seat 17 formed on its inner face while its outer face provides a shank 18 terminating in a contact head 19, of less diameter than the base 16 but of greater diameter than the shank portion.

All of these plug closure parts are preferably formed integral, and a small axial bore 20 extends therethrough, which terminates at its inner end in a countersunk recess 21 while its outer end merges into a minutely restricted bore 22 that in turn terminates in a diagonal groove or recess 23 provided at the outer face of the head 19.

24 is a gasket of rubber, or other suitable substitute, centrally apertured to fit over the shank portion 18, between the base disk 16 and the head 19, and providing an outer seating face 25, which latter may be slightly recessed or depressed to partially receive the head 19, although the latter should project substantially beyond the gasket, but the face 25 need not necessarily be recessed at all as the head 19 may just as well be wholly disposed exteriorly of the seating face 25.

In practice, the plug closure is screwed up into place, as a unit, until the outer face of the head 19 lies practically flush with the bottom of the casing, so that the seating face 25 is disposed slightly within the threaded end 12, it being understood that the head 19 serves as a contact means for engaging the projecting stem of an inflation valve, while the face 25 seats down snugly on the valve casing nipple to prevent any leakage of pressure, excepting the escape into the gage, when the inflation valve is opened by the head 19.

It may be said that if the axial bore through the plug closure was of the same diameter for its whole length, it would be very susceptible of becoming clogged up with dirt, and I guard against this by making the bore 20 of greater diameter than the minutely restricted bore 22, which latter is of about the diameter of a very fine needle, so that should the bore 22 become slightly clogged, the dirt would most likely be blown clear by the air pressure, or could be readily removed with a straw or other fine article, as the bore 22 only extends a slight distance from the recess 23 before it merges into the larger bore 20. It may be further said that, in addition to functioning as a passage for air to the said axial bore, the diagonal recess 23 also serves as a means for receiving the end of a screw-driver, or analogous implement, whereby the plug closure, with its gasket, may be screwed home as a bodily whole or unit, and without requiring any further capping element. While these various features, as just described, may not all be entirely new *per se*, it is believed that they are novelly combined as a whole and function in a very useful and advantageous manner.

Within the chamber 11, above the plug closure, there is disposed a piston head, embodying a cupped or other suitable form of washer indicated at 26, from which there is upwardly projected an axial guide stem or rod 27 of suitable dimensions, and the operating face of this piston head is opposed to the inner opening of the axial bore through the plug closure.

In specific construction this piston head may preferably be formed with the leather disk 26 of larger diameter than the bore or chamber 11 to provide a cupped washer, which leather disk is firmly held between an upper metallic disk 28, of about the same diameter as the bore 11, and a lower metallic disk 29, of about the same diameter as the annular fixed seat 17 of the plug closure, all of said disks being centrally apertured to receive a reduced end 30 of the rod 27, which reduced end may be peened over as a rivet head at 31, within an annular recess of the disk 29, or if no such recess is formed in the disk 29, then the countersunk recess 21 of the plug closure should be made large enough so that the rivet head 31 will be received therein without striking any parts, as the piston disk 29 seats upon the annular seat 17 when the piston descends to its lowermost position.

Freely associated with the guide rod 27 is an indicator member, which is preferably in the nature of a tubular sleeve or barrel 32, loosely encompassing the guide rod, and which is open at its lower end and closed at its upper end desirably as at 33. In its normal position, the upper end of this indicator barrel lies flush with the exterior surface of the top of the casing, while its open end rests upon the upper disk 28 of the piston, it being observed that the piston stem 27 is actually of shorter length than its telescoping indicator barrel 32, the top of which latter is never engaged and elevated by the former; and it is to be particularly noted also that there is no actual connection between this indicator barrel and the piston head, or its stem, the barrel and piston being operable conjointly in their upward movements and independently of each other in their downward movements.

Freely encircling the indicator barrel is a coil spring 34, preferably of a special design as will be hereinafter explained, the lower end of which rests upon the metallic disk 28 of the piston head, and in the preferred form of the device the upper end of this coil spring supports a disk or washer 35, preferably of cork or other springy-like material, and forces or feeds the same with a constant and uniform pressure snugly up against the conical seat 14 formed adjacent the opening 13. The part 35 is apertured centrally to snugly receive and engage the indicator barrel with a gripping but yielding pressure.

Where a tongue 15 is employed on the casing, a longitudinal groove 36 is also formed along the outside face of the indicator barrel, opening at its upper end to the top face 33 thereof, to receive the tongue 15 with which it coöperates to prevent the barrel from turning, and 37 designates a suitable graduate scale on the barrel for indicating pressures, which may be readily read by using the top face of the casing as the index line.

Where a cork washer 35, or one of analogous substance, is employed as the yielding frictional engaging means for the indicator barrel, this washer may be in the form of a complete annulus, or a split ring as at 35$^a$ Fig. 7, and it may have a beveled upper face, as in Figs. 1 and 2, or be flat surfaced, in which latter case the beveled conical seat 14 would be altered no doubt to substantially correspond with a shoulder seat more similar to that indicated at 14$^a$ in the modification of Fig. 8. At any event, being directly supported by the upper end of the spring, the latter tends to force the inner periphery of the cork washer snugly up against the indicator barrel, with a slight but commensurate feed to compensate for wear, and to this end it is at present believed that the conical seat 14 may be the preferable structure.

However, I do not wish to impose any unnecessary limitations upon myself in this connection, with reference to other novel features of the invention, as this yieldingly gripping means may be substantially altered perhaps in various satisfactory ways, as for instance to embody a resilient metallic engaging means. By way of illustration, one type of such latter means is shown at Fig. 8, where 35$^b$ designates a springy metallic washer, of the split type as at 35$^a$ Fig. 7, and which has a central aperture that is slightly less normally than the diameter of the barrel 32, but instead of mounting such a type of resilient metal washer directly upon the coil spring 34, it is desirable to interpose a non-springy washer 38 between the washer 35$^b$ and the top of the coil spring, so that the washer 35$^b$ will have a freer lateral springy play; but at all events the yielding washer is not positively held or clamped in place, and is always directly or indirectly supported by the top of the coiled spring.

From the foregoing replete description, it is believed that the operation of the device will be self-evident, although it may be said that when the device is placed over the nipple of an inflation valve casing, the contact head 19 engaging the projecting end of the stem of the valve will open the latter, while the face 25 of the gasket 24 seats down tightly on the top edge of the valve nipple, whereupon the air pressure in the pneumatic tire will escape only to the piston head of the device, through the conduit 23—22—20—21, and in operating the piston upwardly the latter will elevate the indicator barrel correspondingly. The coil spring will immediately retract the piston head and its guide stem, when the air pressure is relieved, but the indicator barrel is maintained set, by the pressure of the yieldingly friction engaging means, until forced down again by external means.

Of course, it is understood that the coil spring must be proportionately tensioned, relatively to the indicator scale, to properly register the air pressure. In some devices, with a long casing, a coil spring might suffice which is formed of wire that is circular in cross-section, but with a casing of diminutive length it does not appear that such a type of coil spring is the most efficient practically, whereas it is very important for many reasons that the gage should be of short length, and especially inasmuch as a gage that is too long cannot be operated conveniently, if at all, with some rear wheel tires, on account of short spokes and contiguous brake casing, or with some front wheels and rear wheels, owing to short spokes, crossed wire spokes, webbed constructions or other obstructing parts, and in this connection the more or less flattened, or elliptical transverse, form of my device makes it additionally effective.

My coil spring, therefore, is formed of resilient wire that is flattened or substantially rectangular in cross-section, and preferably a trifle elongated radially, which enables me to employ a highly tensioned spring, of proper resistance, in the comparatively short length casing of my compact device.

It has been seen that my indicator barrel is not connected with the piston head, and it may be further emphasized that the indicator barrel does not encompass the piston retracting coil spring, nor is the piston stem hollow to receive the coiled spring; but reversely the coil spring freely encircles the indicator barrel, whereby it may support the yielding washer, which indicator barrel directly encompasses the piston guide stem, with a loose fit, so that the barrel and stem directly coöperate as axial centering means for each other, in such manner that there is little or no danger of the piston head tending to stick, from tilting displacement, nor of the ends of either barrel or piston stem coming into engagement with the coils of the spring.

Furthermore, it may be said that the bore 20 of the plug closure being of substantially greater diameter than the minute inlet 22, it provides more or less of an initial expansion space, as it were, whereby the air pressure on the piston head is modulated or without a spurting effect, that would be caused by a larger inlet bore of the same diameter for its whole length, and which might tend to shoot the indicator up with an initial spurt that would cause it to register at a slightly higher mark perhaps than the actual pressure in the tire. Analogously, there would result that same undesirable tendency when an initial upward jolt was given to the indicator member, as where a stem or rod on the piston engages and elevates the indicator member, instead of the latter being normally supported directly by the piston proper.

I am aware of the fact that other analogous forms of pressure gages for pneumatic tires have previously been used, and possibly patented, which disclose some of the broader features of my device as illustrated, but I make no broad claims to the generic idea as such, nor on the other hand do I wish to limit myself unnecessarily to the exact details of construction as shown and described, excepting as they may come within the purview of the ensuing claims, when fairly interpreted and viewed in the light of the specification and understood equivalents.

What I do claim, as new and patentable, is:—

1. A pressure gage embodying a hollow casing forming a chamber that provides an upper internal seat, encompassing a top aperture, and having a bottom closure providing a pressure fluid duct, a valve stem contacting element and a surrounding seating face; a piston in said chamber having a guide stem; an elongated indicator member normally seated freely on said piston, in contiguous association with said guide stem, and operating through said top aperture; compressible retractile means supported by said piston; and yielding frictional means, supported by said retractile means and forced up thereby against said upper internal seat, in encompassing engagement with said indicator member, substantially as described.

2. A pressure gage embodying a hollow casing forming a chamber that provides an upper internal seat, encompassing a top aperture, and having a bottom closure providing a pressure fluid duct, a valve stem contacting element and a surrounding seating face; a piston in said chamber having a guide stem; a tubular indicator normally seated freely on said piston, in encompassing association with said guide stem, and operating through said top aperture; a coiled spring encircling said tubular indicator and its contained guide stem; and a washer of yielding material supported by said coiled spring and forced upwardly thereby against said upper internal seat, in yieldingly frictional engagement with said tubular indicator, substantially as described.

3. A pressure gage embodying a casing, formed as an integrally walled unit, that is substantially elliptical in cross-section, which provides a longitudinal chamber with an open lower end and an upper internal seat that encompasses a restricted top aperture; a plug closure for said lower open end providing a pressure fluid duct, a valve stem contacting element and a surrounding seating face; a piston in said chamber having a guide stem; a tubular indicator normally seated freely on said piston, in encompassing association with said guide stem, and operating through said top aperture; a coiled spring encircling said tubular indicator and its contained guide stem; and a washer of yielding material supported by said coiled spring and forced upwardly thereby against said upper internal seat, in yieldingly frictional engagement with said tubular indicator, substantially as described.

4. A pressure gage embodying a casing, formed as an integrally walled unit, that is of comparatively short length and substantially elliptical in cross-section, which provides a longitudinal chamber with an open lower end and a top aperture; a plug closure for said open lower end providing a pressure fluid duct, a valve stem contacting element and a surrounding seating face; a piston in said chamber having a guide stem; an elongated indicator member normally seated freely on said piston, in contiguous association with said guide stem, and operating through said top aperture, the said indicator member being but slightly longer than said guide stem; a coiled spring encircling said indicator member and its contiguous guide stem, the said spring being formed of resilient wire that is substantially flattened in cross-section; and means for retaining said indicator member in set position after actuation by said piston, substantially as described.

5. A pressure gage embodying a casing, formed as an integrally walled unit, that is of comparatively short length and substantially elliptical in cross-section, which provides a longitudinal chamber with an open lower end and an upper internal seat that encompasses a restricted top aperture; a plug closure for said open lower end providing a pressure fluid duct, a valve stem contacting element and a surrounding seating face; a piston in said chamber having a guide stem; a tubular indicator normally seated freely on said piston, in encompassing association with said guide stem, and operating through said top aperture, the said tubular indicator being but slightly longer than said guide stem; a coiled spring encircling said tubular indicator and its contained guide stem, the said spring being formed of resilient wire that is substantially rectangular or flattened in cross-section; and a washer of yielding material supported by said coiled spring and forced upwardly thereby against said internal upper seat, in yieldingly frictional engagement with said tubular indicator, substantially as described.

In testimony whereof, I affix my signature.

ARTHUR B. LOW.